April 16, 1935.  N. TITLESTAD  1,998,106
NITRIC ACID MANUFACTURE
Filed Dec. 3, 1931   2 Sheets-Sheet 1

INVENTOR
NICOLAY TITLESTAD
BY
Cavanagh & James
ATTORNEYS

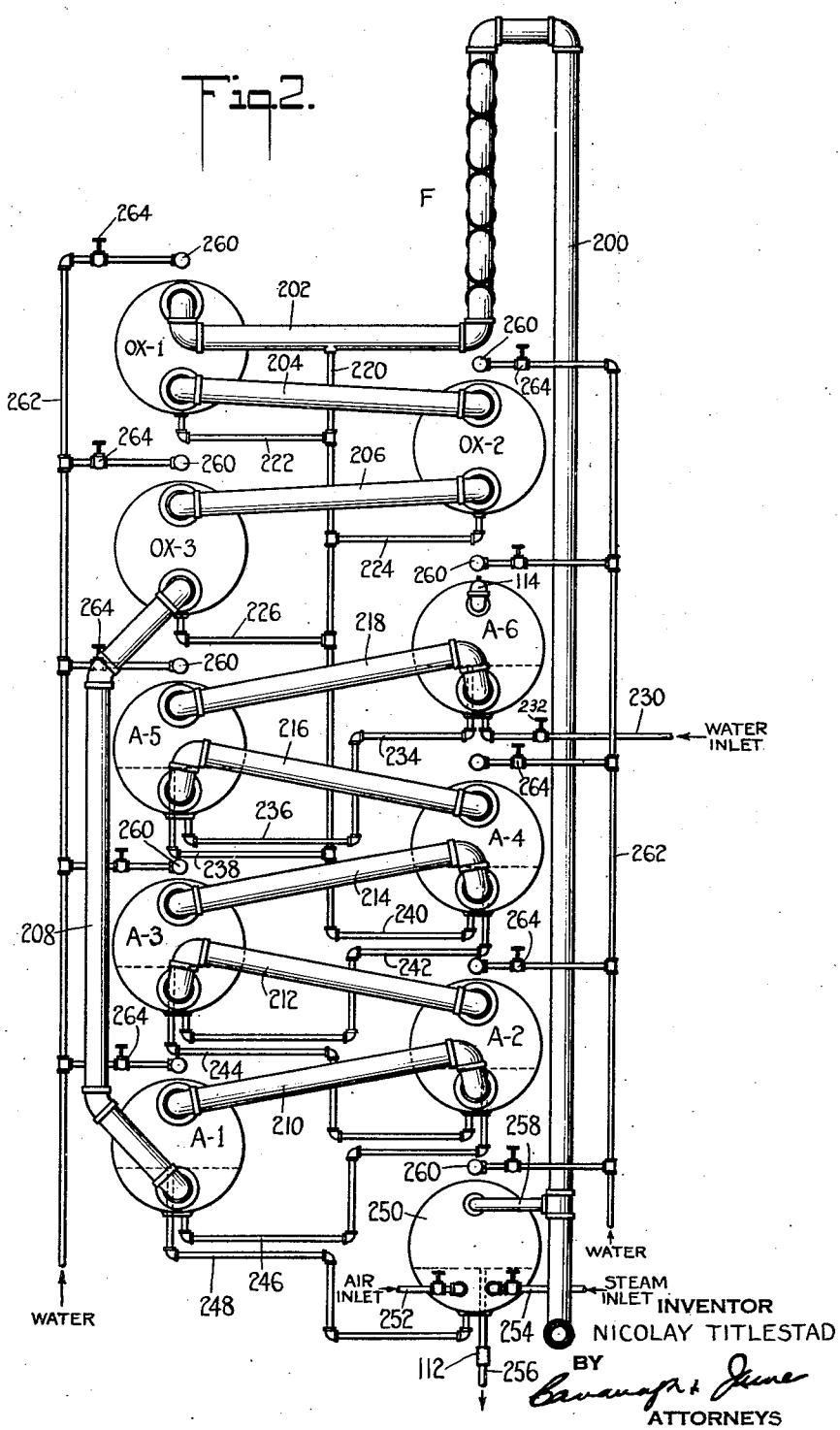

Patented Apr. 16, 1935

1,998,106

UNITED STATES PATENT OFFICE 1,998,106

NITRIC ACID MANUFACTURE

Nicolay Titlestad, Charlotte, N. C., assignor to Chemical Construction Corporation, Charlotte, N. C., a corporation of Delaware Application December 3, 1931, Serial No. 578,657

6 Claims. (Cl. 23—260)

This invention relates to the manufacture of nitric acid, and more particularly to the manufacture of nitric acid by the catalytic conversion or oxidation of ammonia vapor.

The present invention involves a number of features and may be considered in several aspects. Some of the features of the invention center about the control of the relative flow of a liquid and a gas, particularly the flow of ammonia liquor and air to a stripping tower, and the invention considered in that aspect including its relation to the complete acid manufacturing system is claimed and more completely described in my copending application Ser. No. 411,019, filed December 2, 1929, of which the present application is a continuation in part. Other features of the present invention center about the absorption system for the oxidized ammonia gases, and the relation of the same to the complete nitric acid manufacturing system; and the invention considered in this second aspect is being claimed herein.

In the example herein disclosed, the invention is applied specifically to the manufacture of nitric acid. This may be obtained by a process consisting generally of removing ammonia from ammonia liquor by a current of air, and oxidizing the ammonia or causing reaction of the mixture of ammonia and air in a catalytic converter, after which the oxidized ammonia may be absorbed to form nitric acid of a desired concentration.

One primary object of the present invention, considered in the aspect herein claimed, resides in the provision of an improved absorption system for the absorption of a gas in a liquid, and more particularly a multiple drum absorption system for the absorption of ammonia oxidation gases or nitric acid anhydride gases for the production of nitric acid. The multiple drum absorption system preferably comprises a series of drums arranged at progressively increasing altitudes, which drums are connected for vapor flow in a series beginning with the lowermost drum, and are connected for liquid flow in a series beginning with the uppermost drum. A body of liquid is maintained at the bottom of each of the drums, and the gas is caused to bubble through this liquid in each drum as it flows in series through the drums. Some of the absorbing liquid may be obtained by preliminary cooling or condensation of the ammonia oxidation gases, as by means of air cooled condenser pipes. The efficiency of the drum absorption system is greatly increased by the expedients, first, of directly water cooling the drums, and secondly, maintaining the absorption system under pressure.

A further object of the present invention is to generally improve the method and apparatus used for the manufacture of nitric acid by ammonia oxidation, to which end the distillation of ammonia from the ammonia liquor is conducted under reduced pressure while the catalytic conversion and the absorption of the oxidized gas is conducted under increased pressure, and during the gas absorption the gas is cooled in several stages and finally passed through a water cooled multiple drum absorption system, all while under pressure.

To the accomplishment of the foregoing and such other objects as will hereinafter appear, my invention consists in the method and the apparatus elements and their relation one to the other as hereinafter are more particularly described in the specification and sought to be defined in the claims. The specification is accompanied by drawings, in which:

Fig. 2 is a modification.

Figure 1:
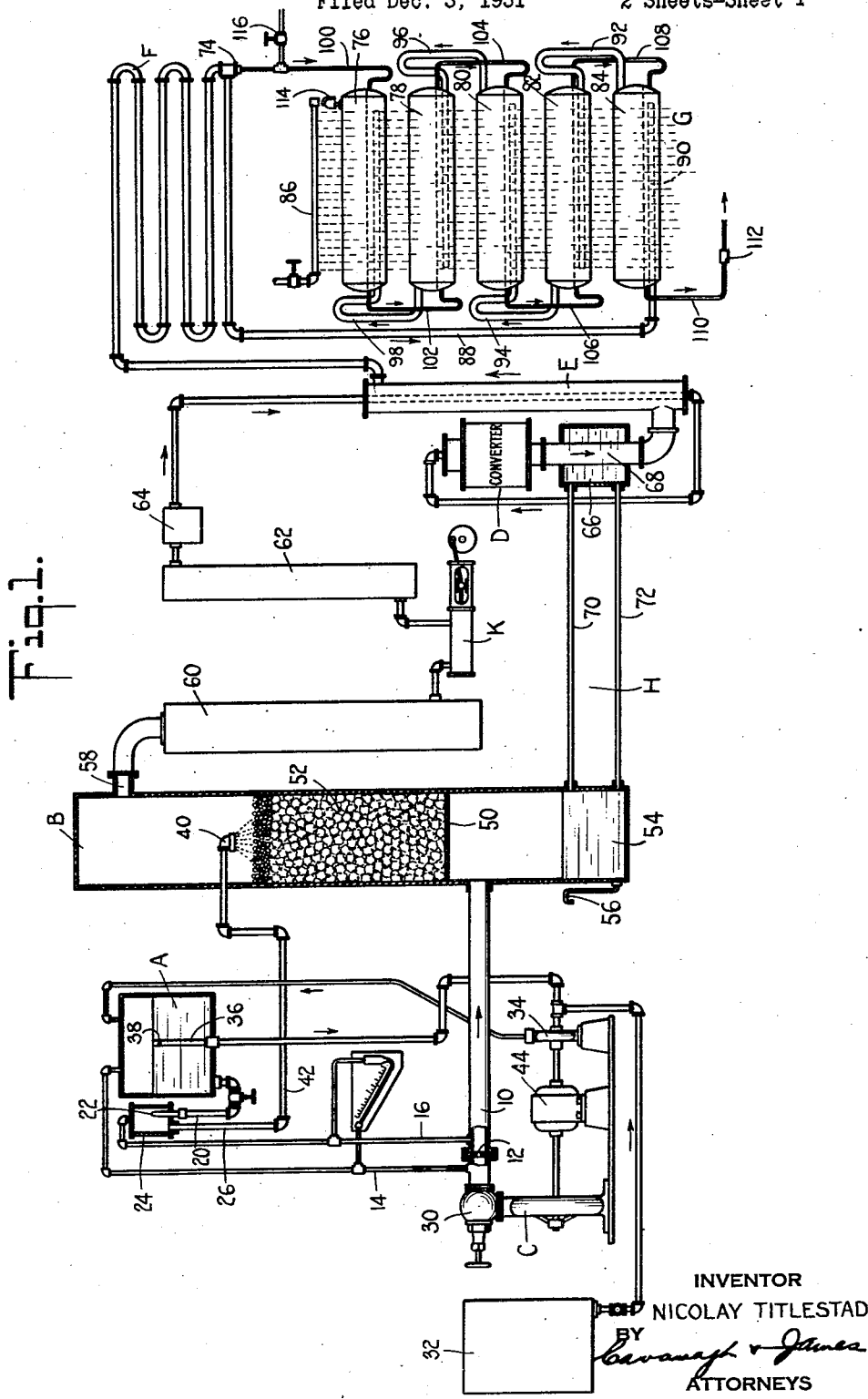
Fig. 1 is a flow diagram for one form of apparatus embodying my invention.

Referring to Fig. 1 of the drawings, the apparatus consists generally of a source of aqua ammonia or ammonia liquor A, a stripping tower B through which ammonia liquor is allowed to trickle downwardly, a source of air represented by the blower C, a stream of air from which is blown upwardly through the stripping tower B, where it removes ammonia from the ammonia liquor. The resulting mixture of ammonia and air is passed through a catalytic converter D, where the ammonia is oxidized by the air and the oxidized ammonia is cooled in the heat exchanger E, air cooled pipes F, and finally is further cooled and absorbed to form nitric acid in a multiple drum absorption system G. A part of the heat of reaction of the catalytic conversion may be transferred through the thermal system H to the stripping tower B, thereby aiding in the distillation of ammonia from the ammonia liquor. The pressure in the stripping tower B may be reduced to further aid in the distillation of ammonia, and the pressure in the converter D and the cooling and absorption stages E, F, and G, may be increased to aid in the absorption of the nitric acid, by a compressor K, preferably located, as shown, between the stripping tower and the converter.

That part of the detailed description in my copending parent application Ser. No. 411,019 which applies particularly to the flow ratio control means is being somewhat shortened and is presented in the next paragraph.

It is exceedingly important in the operation of such an ammonia oxidation plant that the gas fed to the converter be of constant composition, and preferably of an optimum composition, say, 9 or 10 per cent strength, for maximum yield. In order to obtain this desired gas composition it is necessary that the quantities of ammonia liquor, air, and heat supplied to the stripping tower be kept in proper proportion. Aside from the desire for efficient operation and yield of the apparatus, proper regulation of the factors involved is essential in order to prevent actual damage to the apparatus, and particularly to the catalyst, such as platinum, in the converter. In accordance with the present invention, the ratio of the rates of flow of the ammonia liquor and air is automatically kept at a constant and predetermined desired value. The air flow is conducted through any suitable gas flow conduit 10. In this conduit, means, here exemplified by the orifice plate 12, is provided to obtain a pressure differential dependent upon the rate of flow of gas through conduit 10. The ammonia liquor is contained in a source A, which preferably is a constant level tank, and flows therefrom through any suitable conduit 20, in which a suitable orifice nozzle or constriction is located as at 22. The orifice 22 is preferably located at the same level as the liquid in level tank A. The orifice 22 may be surrounded by a suitable chamber 24 into which liquid flowing through the orifice is discharged. Such liquid then flows to a discharge or drain pipe 26, from which it may be utilized as shown. Now, in accordance with the present invention, the pressure differential obtained across gas flow orifice 12 is utilized to cause a flow of liquid through the liquid flow orifice 22, or more specifically, the pressures before and after the gas flow orifice 12 are applied through pipes 14 and 16 respectively, to the level tank A and the discharge chamber 24. Inasmuch as the flow of a liquid through an orifice follows the same laws as the flow of a gas through an orifice, the liquid flow may be kept proportional to the gas flow entirely automatically. As specifically applied to the ammonia oxidation equipment here disclosed, air may be fed to stripping tower B through conduit 10, from a blower C, and the quantity of air may be regulated by a valve 30. This single valve serves to control the rate of ammonia oxidation and the rate of nitric acid manufacture for the entire plant. A store of ammonia liquor is kept in a tank 32 and is pumped by a pump 34 to the liquor source or level tank A, at a rate faster than the rate of use, the excess liquor flowing into an overflow pipe 36 and back to tank 32 and pump 34. The liquor discharge pipe 26 runs from the discharge chamber 24 to a distributing head or nozzle 40 in the stripping tower B, and preferably includes a liquid seal formed by a U-shaped section 42 in the discharge pipe line 26, to seal the discharge chamber 24 from the stripping tower B. The air blower C and the liquor pump 34 are preferably driven from a common motor 44 or otherwise suitably interlocked.

The stripping tower B may be of the conventional type including a preferably perforated partition or diaphragm 50, which serves to support a mass of bodies of inert material 52 for dividing the liquor into a plurality of small streams. The excess liquor passes through partition 50 and falls into a reservoir 54 of spent liquor, the level of which is kept constant by an overflow pipe 56.

The air flowing upwardly through stripping tower B, aided by heat supplied to the body of liquid 54 as later described, serves to distill ammonia from the ammonia liquor, and the resulting mixture of ammonia and air passes through the outlet 58 at the top of the stripping tower, from which it is led to the converter D. The compressor K is preferably inserted between the stripping tower B and the converter D to reduce the pressure in the stripping tower, thereby aiding in the distillation of ammonia, and to increase the pressure in the remainder of the system to a value of, say, 50 pounds per square inch in order to aid the catalytic conversion of the gas mixture and the absorption of the oxidized gas to form the desired acid. Gas chambers 60 and 62 are preferably provided before and after the compressor K in order to smooth out the pressure fluctuations caused by the compressor. A gas filter 64 is preferably inserted in the gas flow circuit ahead of the converter in order to prevent impurities from contaminating the catalyst in the converter.

The compressed and filtered gas mixture is preheated in a heat exchanger E and then fed directly into the converter D. This converter may be of conventional type containing a catalyst such as platinum in mesh or like form, which aids reaction between the air and ammonia and causes ammonia oxidation.

A portion of the heat of reaction is led back to the stripping tower B by means of a jacket 66 surrounding the discharge conduit 68 leading from the converter, the jacket 66 being interconnected by pipes 70 and 72 with the body of liquid 54 at the bottom of the stripping tower. The liquid 54 in the stripping tower and in the jacket 66 is circulated by the thermal siphon action caused by the heating of the liquid in jacket 66. The heat transfer to the stripping tower B undergoes only gradual changes, thereby preventing any sudden volatilization of ammonia in the stripping tower which might damage the catalyst in the converter, and these changes are proportioned to the rate of oxidation of ammonia, that is to say, if the air supply is increased by opening valve 30, not only is the ammonia liquor automatically increased in proportion thereto, but also the heat applied to the stripping tower is somewhat increased due to the increased converter temperature, so that all of the factors involved in the ammonia oxidation process are kept in step.

The reaction gases are somewhat cooled in the heat exchanger E and thereafter are further cooled in the air cooled coils or condenser F, the cooled gas and already liquefied condensate being separated at the point 74.

The nitric acid is finally absorbed to the desired strength in a multiple drum absorption system G, consisting of a plurality of drums 76, 78, 80, 82, and 84, over which a stream of cooling water is constantly spread from distributing pipes 86.

The cooled reaction gas from cooler F is led by pipe 88 to drum 84, the gas being discharged from a perforated pipe 90 immersed beneath the level of the acid in drum 84. Part of the gas is absorbed, thereby strengthening the acid, and the remainder of the gas, which bubbles through the acid, rises through pipe 92 and is similarly discharged or bubbled through the liquid in drum 82. The excess gas is led by a pipe 94 to drum 80 where it is bubbled through the liquid therein, and partially absorbed, the excess being led to drum 78 through pipe 96, and the excess in drum 78 being led through pipe 98 to the liquid in drum 76. The capacity of the drum absorption system is designed so that the gas is capable of being fully absorbed after traversing the entire system of drums.

Condensate from cooler F separated at 74 is led through a pipe 100 to drum 76, from which liquid is led by a pipe 102 to drum 78, from which liquid is led to drum 80 by a pipe 104, and so on to drums 82 and 84, through pipes 106 and 108. The final nitric acid product of desired strength is withdrawn through a pipe 110 and a trap 112 of suitable design. The interconnecting pipes 100, 102, 104, 106, 108, and 110 each are connected to the drums at the proper level for maintaining the desired body of liquid in each of the drums. Each of these interconnecting pipes is also provided with a U-shaped liquid seal or trap, and the gas flow interconnecting pipes 92, 94, 96, and 98 are preferably also provided with inverted U-shaped bends, thereby insuring proper separation of the gas flow and the liquid flow. Drum 76 is provided with a pressure relief valve 114 which serves to maintain the pressure in the absorption system at the desired value against the operation of compressor K, but permits the pressure to be relieved in the event of it reaching an excessive value.

It should be noted from the drawings that the liquid level in each of the drums is such as to provide a fairly substantial body of liquid therein, and yet provides an even larger open space or vapor chamber in the upper portion of each of the drums. It should also be noticed that the air cooled condenser pipes F are preferably located at a height greater than that of the drum absorption system G, so that any condensation which takes place in the condenser F results in the condensate therein tending naturally to gravitate downwardly to the point 74 and thence to the drum absorption system G. No difficulty resides in feeding the gas upwardly to condenser F, because the heat exchange elements 66 and E preceding the condenser F do not cool the gas sufficiently to cause condensation or liquefication. The air cooled condenser F for preliminarily cooling the ammonia oxidation gases not only reduces the temperature of the gases prior to attempting to absorb the same in the liquid, but also provides a part of the initial liquid or condensate which is fed through the drums for absorption of the gas. The absorption liquid is nitric acid of increasing strength as the lower drums are reached.

As is well known, the absorption efficiency decreases when the strength of the acid produced exceeds a preferred amount. It is therefore desirable to add make-up water to the absorption liquid in order to keep the strength of the finished acid down to the best value. This make-up water may be fed directly into pipe 100 through an appropriately valved water supply pipe 116.

It should further be noted that by the provision of pressure valve 114, the entire system following the compressor K is kept under pressure, and it is obvious that maintaining the multiple drum absorption system G under pressure greatly facilitates the absorption of the ammonia oxidation gas and the production of nitric acid. Likewise, the provision of ample cooling water sprayed directly upon the drums keeps the same at a desired relatively low temperature despite the tendency for heat to develop therein, and this low temperature again increases the absorption and production of nitric acid.

A modified form of the absorption system of my invention may be described in connection with Fig. 2. In Fig. 2, the drums A—1, A—2, A—3, A—4, A—5, and A—6 are absorption drums corresponding to the drums 84, 82, 80, 78, and 76 in Fig. 1. The cooler or air cooled condenser F corresponds to the condenser F in Fig. 1. Between the condenser F and the absorption drum A—1, however, the present arrangement, unlike that previously described, includes one or more secondary oxidation chambers which may, if desired, take the form of the three drums Ox—1, Ox—2, and Ox—3. These chambers may take any form, and it is merely for structural convenience and interchangeability that they are here shown as having a size and construction generally resembling that of the absorption drums A—1 through A—6.

It will be readily noted from the drawings that the oxidized nitrogen gas is supplied through a riser 200 to the top of condenser F, from the bottom of which the gas flows through a pipe 202 into the first secondary oxidation chamber Ox—1, from which it flows through a pipe 204 to the next secondary oxidation chamber Ox—2, after which it is led by a pipe 206 to the third secondary oxidation chamber Ox—3. The oxidized gas is then led from the drum Ox—3 downwardly through a pipe 208 to the bottom of the first absorption drum A—1. It should be noted that the intake ends of pipes 204, 206, and 208 are connected to the ends of the drums Ox—1, Ox—2, and Ox—3 at points elevated at least a little above the bottoms of the drums, which permits the separation and collection of any condensate or liquid which may form in any of the chambers.

The internal construction of each of the absorption drums A—1 through A—6 may resemble that already described in connection with Fig. 1, that is, the gas supplied through pipe 208 flows into a perforated horizontal pipe extending along the bottom of drum A—1 and immersed in the liquid content thereof. The liquid drain pipes in each of the absorption drums maintain the liquid level at about a third the height of the drum, which is sufficient to provide a rapid rate of absorption, while at the same time providing ample chamber space above the liquid. The top of absorption drum A—1 is connected to the bottom of absorption drum A—2 through pipe 210. The top of absorption drum A—2 is connected to the bottom of absorption drum A—3 through pipe 212, and the remaining drums are similarly connected in series by means of pipes 214, 216, and 218. In each case it should be noted that the interconnecting pipes are given inverted bends, just as was the case in Fig. 1, in order to provide a liquid seal between the successive drums. In comparison with the arrangement shown in Fig. 1, it may also be observed that the various drums are arranged in staggered or zig-zag formation instead of directly above one another, in order to reduce the necessary over-all height of the assembled apparatus.

Liquid formed in the condenser F is drained by a drain pipe 220. Liquid formed in chamber Ox—1 is drained by a drain pipe 222 which runs into and is connected with the drain pipe 220. Similarly, any liquid formed in chambers Ox—2 and Ox—3 is drained through pipes 224 and 226 respectively, and connected to the vertical drain pipe 220. The total liquid or condensate is then led to the absorption drum system. However, inasmuch as this liquid is not simply water, but instead is apt to have considerable nitric acid content, it is desirable to drain the same into the drum absorption system at a point lower than the highest absorption drum A—6. Specifically, the strength of the condensate should be measured, and the condensate should then be led into that one of the absorption drums which, in normal operation, contains acid of a strength corresponding to the strength of the condensate. In the present case, the liquid collected in drain pipe 220 is supplied to the absorption drum A—4.

Make-up water is supplied through a pipe 230 and control valve 232 to the last or highest absorption drum A—6. The liquid in drum A—6 leaves through overflow pipe 234 and is supplied to the next lower absorption tank A—5. The upper end of overflow pipe 234 is, of course, so connected as to maintain the desired liquid level or liquid content in the absorption drum A—6, and the same applies to each of the overflow pipes connected to the next lower drums. It should also be noted that pipe 234 is given a downward U-shaped bend 236, thereby providing a liquid seal between drums A—6 and A—5, and the same applies to each of the succeeding overflow pipes.

Liquid is fed from drum A—5 through a pipe 238 to the next lower absorption drum A—4. The drain pipe 220, heretofore described as collecting the condensate from condenser F and secondary oxidation chambers Ox—1, Ox—2, and Ox—3, is connected to pipe 238, and the combined liquid is then supplied through pipe 240 to the absorption tank A—4. The liquid is then fed in series through the remaining drums by means of pipes 242, 244, and 246. The absorption liquid is nitric acid of increasing strength starting with water at the top and ending with fairly strong nitric acid at the bottom.

The present arrangement further includes a collector tank 250 which is the lowest drum shown and which is used to steam or/and clean or/and bleach the acid produced by the system. The concentrated acid from the lowest absorption drum A—1 is fed through overflow pipe 248 to tank 250. The latter has connected thereto an air supply pipe 252 and a steam supply pipe 254, and either air or steam may be blown through the finished acid, in order to clean the same. The acid is finally removed through an overflow pipe 256 and trap 112, which overflow pipe, as in the case of the other tanks, maintains a desired liquid level in the tank. The vapor discharged from the tank is preferably led from the top of the tank through a pipe 258 to the main riser pipe 200 through which the supply of nitrogen oxide gas is being led from the conversion system to the absorption system. It will be understood, of course, that the riser pipe 200, leading to the top of condenser F, corresponds to the similar riser pipe shown in Fig. 1 also leading to the top of condenser F, and that the entire nitric acid manufacturing apparatus preceding the absorption system may, if desired, correspond to that shown in Fig. 1. As was explained in connection with Fig. 1, the absorption of nitric acid is preferably accomplished under pressure, and to that end the entire system here described in connection with Fig. 2 is completely enclosed, and the last absorption drum A—5 is provided with a safety valve or/and blow-off valve 114 corresponding to the valve 114 shown in Fig. 1.

It will also be understood that in the arrangement shown in Fig. 2, just as in the arrangement shown in Fig. 1, cooling water may be applied to the various drums of the absorption system, and to this end perforated water spray pipes 260 are located, preferably one over each of the drums, as shown in the drawings, thereby permitting cooling water to be sprayed or flooded over the various drums. The pipes 260 are connected to main supply pipes 262, and individual valves 264 are provided for each of the spray pipes 260 so that the use, distribution and amount of cooling water applied to some or all of the various individual drums may be controlled, stopped, or regulated as desired.

It will be understood that the feature of the arrangement in Fig. 2, whereby the condensate from condenser F is led into an absorption drum lower than the highest absorption drum A—6, may equally well be applied to the arrangement shown in Fig. 1, should such a modification prove desirable.

The nitric acid manufacturing system of my invention and the many advantages thereof will, it is believed, be apparent from the foregoing description thereof. It will be understood that some of the features of the absorption system may be applied to the absorption of gases other than in the formation of nitric acid. It will also be understood that the feature of the arrangement in Fig. 2 whereby the condensate from condenser F is led into an absorption drum lower than the highest absorption drum A—6 may equally well be applied to the arrangement shown in Fig. 1. Furthermore, the secondary oxidation chambers shown in Fig. 2 may be used in Fig. 1. It will be appreciated by those skilled in the art that the location of such secondary oxidation chambers following the converter, if special chambers are used for this purpose, may be varied according to particular requirements and preferences, it being feasible, for example, to locate the same before instead of after the condenser F. Those skilled in the art will also understand that the compressor, if one be used, may be located elsewhere in the system than shown, as, for example, after instead of before the converter. In any case, the invention as applied to the absorption system itself is valuable regardless of the source and mode of manufacture of the oxidized nitrogen gas.

It will therefore be apparent that while I have shown and described my invention in preferred forms, many changes and modifications may be made in the apparatus disclosed, without departing from the spirit of the invention, defined in the following claims.

I claim:

1. A multiple drum absorption system comprising a plurality of horizontally disposed drums, a perforated gas pipe extending horizontally near the bottom of each of the drums, overflow outlets so located as to maintain a body of liquid in each of the drums covering the perforated pipes, a feed conduit to supply the gas to be absorbed to the perforated pipe in a first drum in order to bubble the gas through the liquid in said drum, a conduit connecting the upper portion of the first drum to the perforated pipe in a second drum in order to bubble the residual gas through the liquid in the latter drum, and so on, until the last drum is reached, piping to convey liquid from the overflow outlet of the last drum to the next preceding drum and so on, until the first drum is reached, and cooling means associated with the drums to cool the same during the absorption process.

2. A multiple drum absorption system for the absorption of an acid anhydride gas in water, comprising a plurality of horizontally disposed drums arranged at progressively increased elevations, a perforated gas pipe extending horizontally near the bottom of each of the drums, overflow outlets so located as to maintain a body of liquid in each of the drums covering the perforated pipes, a feed conduit to supply the gas to be absorbed to the perforated pipe in the lowermost drum in order to bubble the gas through the liquid in said drum, a conduit connecting the upper portion of the drum to the perforated pipe in the next higher drum in order to bubble the residual gas through the liquid in said next higher drum, and so on, until the highest drum is reached, connections to convey liquid from the overflow outlet of the highest drum to the next lowermost drum and so on, until the lowermost drum is reached, the aforesaid connections including liquid seals for properly isolating the liquid and gas flow at each of the drums, and spray heads associated with the drums to spray the drums with water in order to cool the same during the absorption process.

3. An arrangement for the manufacture of nitric acid, comprising a stripping tower for stripping ammonia from ammonia liquor, a catalytic converter for oxidizing the ammonia, a compressor between the stripping tower and the converter for reducing the pressure in the stripping tower and raising the pressure in the remainder of the system, an elevated condenser for preliminarily cooling the ammonia oxidation gases, a multiple drum absorption system including a plurality of drums arranged at progressively increased elevations, piping connecting the condenser to a high drum for liquid flow from the condenser to the drum absorption system, a conduit connecting the condenser to a low drum for gas flow from the condenser to the drum absorption system, overflow outlets so located as to maintain a body of liquid in each of the drums, a discharge nozzle on said conduit to bubble the gas through the liquid in the low drum, a conduit connecting the upper portion of said drum to the lower portion of the next higher drum in order to bubble residual gas through the liquid in the latter drum, and so on, until the highest drum is reached, piping to convey liquid from the overflow outlet of the high drum to the next lower drum, and so on, until the lowermost drum is reached, and water cooling means associated with the series of drums for cooling the same.

4. An arrangement for the manufacture of nitric acid, comprising a stripping tower for stripping ammonia from ammonia liquor, a catalytic converter for oxidizing the ammonia, a compressor between the stripping tower and the converter for reducing the pressure in the stripping tower and raising the pressure in the remainder of the system, a first heat exchange means for transferring the heat of reaction from the converter to the stripping tower, a second heat exchange means for warming the inlet and cooling the outlet gases from the converter, an elevated air cooled condenser for further cooling the ammonia oxidation gases, a multiple drum absorption system including a plurality of drums arranged at progressively increased elevations, piping connecting the condenser to a high drum for liquid flow from the condenser to the drum absorption system, overflow outlets so located as to maintain a body of nitric acid in each of the drums, a conduit to bubble the gas after leaving the condenser through the nitric acid in the low drum, a conduit connecting the upper portion of said drum to the lower portion of the next higher drum in order to bubble residual gas through the nitric acid in the latter drum, and so on, until the highest drum is reached, piping to convey nitric acid from the overflow outlet of the high drum to the next lower drum, and so on, until the lowermost drum is reached, and water cooling means associated with the series of drums for cooling the same.

5. An arrangement for the manufacture of nitric acid, comprising a supply conduit for oxidized ammonia gases, secondary oxidation chambers, a multiple drum absorption system including a plurality of drums arranged at progressively increased elevations, overflow piping connecting the drums for liquid flow in a series beginning with the uppermost drum and for maintaining a body of liquid in each of the drums, conduits connecting the drums for vapor flow in a series beginning with the lowermost drum and for bubbling the gas through the liquid in each of the drums, a make-up water supply pipe connected to the uppermost drum, means to drain liquid condensate from the oxidation chambers into the absorption system at an intermediate drum, and cooling means for cooling the series of drums.

6. An arrangement for the manufacture of nitric acid, comprising a supply conduit for oxidized ammonia gases, an elevated condenser for preliminarily cooling the ammonia oxidation gases, secondary oxidation chambers, a multiple drum absorption system including a plurality of drums arranged at progressively increased elevations, overflow piping connecting the drums for liquid nitric acid flow in a series beginning with the uppermost drum and for maintaining a body of liquid nitric acid in each of the drums, conduits connecting the drums for vapor flow in a series beginning with the lowermost drum and for bubbling the gas through the nitric acid in each of the drums, a make-up water supply pipe connected to the uppermost drum, means to drain liquid condensate from the condenser or/and oxidation chambers into the absorption system at an intermediate drum, cooling means for cooling the series of drums, and compressor means for keeping the condenser, oxidation chambers and absorber drums under pressure.

NICOLAY TITLESTAD.